(12) United States Patent
Nguyen et al.

(10) Patent No.: US 10,742,591 B2
(45) Date of Patent: Aug. 11, 2020

(54) SYSTEM FOR DOMAIN REPUTATION SCORING

(71) Applicant: Nominum, Inc., Redwood City, CA (US)

(72) Inventors: Thanh Nguyen, Newark, CA (US); Hongliang Liu, Campbell, CA (US); Ali Fakeri-Tabrizi, San Mateo, CA (US); Mikael Kullberg, Stockholm (SE); Paul O'Leary, San Francisco, CA (US); Yuriy Yuzifovich, Los Gatos, CA (US); James Paugh, San Carlos, CA (US); Robert S. Wilbourn, Palo Alto, CA (US)

(73) Assignee: Akamai Technologies Inc., Cambridge, MA (US)

( * ) Notice: Subject to any disclaimer, the term of this patent is extended or adjusted under 35 U.S.C. 154(b) by 120 days.

(21) Appl. No.: 14/937,699

(22) Filed: Nov. 10, 2015

(65) Prior Publication Data

US 2016/0065597 A1    Mar. 3, 2016

Related U.S. Application Data

(63) Continuation-in-part of application No. 13/177,504, filed on Jul. 6, 2011, now Pat. No. 9,185,127.

(51) Int. Cl.
*H04L 29/06* (2006.01)
*H04L 29/12* (2006.01)
*G06F 17/30* (2006.01)

(52) U.S. Cl.
CPC ...... *H04L 61/1511* (2013.01); *H04L 63/1408* (2013.01); *H04L 63/1441* (2013.01); *H04L 2463/144* (2013.01)

(58) Field of Classification Search
CPC ............ H04L 63/1441; H04L 63/1406; H04L 63/1483; H04L 61/1511; H04L 2463/144
See application file for complete search history.

(56) References Cited

U.S. PATENT DOCUMENTS 6,256,671 B1   7/2001   Strentzsch et al.
7,095,715 B2   8/2006   Buckman et al.
(Continued)

FOREIGN PATENT DOCUMENTS

GB        2481356 A    12/2011

OTHER PUBLICATIONS

U.S. Appl. No. 15/799,547, Non-Final Office Action dated Feb. 7, 2018, 12 pages.
(Continued)

*Primary Examiner* — Linglan E Edwards

(57) ABSTRACT

The disclosure is related to computer-implemented methods for domain name scoring. In one example, the method includes receiving a request to provide a reputation score of a domain name, receiving input data associated with the domain name, extracting a plurality of features from the input data and the domain name, generating a feature vector based on the plurality of features, and calculating the reputation score of the domain name by a machine-learning classifier based on a graph database, which includes feature vectors associated with at least a plurality of reference domain names, a plurality of servers, a plurality of domain name owners, and so forth. In another example, the method can calculate the reputation score by finding a similarity between the feature vector and one of domain name clusters in the graph database. The reputation score represents a probability that the domain name is associated with malicious activity.

21 Claims, 6 Drawing Sheets

(56) References Cited

U.S. PATENT DOCUMENTS

| | | | |
|---|---|---|---|
| 7,472,201 | B1 | 12/2008 | Aitken et al. |
| 7,493,403 | B2 | 2/2009 | Shull et al. |
| 7,633,868 | B2 | 12/2009 | Buckman et al. |
| 7,761,583 | B2 | 7/2010 | Shull et al. |
| 8,079,087 | B1 | 12/2011 | Spies et al. |
| 8,090,679 | B2 | 1/2012 | Zhuge et al. |
| 8,224,942 | B1 | 7/2012 | Presotto et al. |
| 8,229,930 | B2 | 7/2012 | Cohen et al. |
| 8,260,914 | B1* | 9/2012 | Ranjan ............... H04L 61/1511 709/224 |
| 8,341,745 | B1 | 12/2012 | Chau et al. |
| 8,499,077 | B2 | 7/2013 | Niemela et al. |
| 8,578,493 | B1* | 11/2013 | Cowan ................ G06F 21/554 709/224 |
| 8,606,926 | B2 | 12/2013 | Ulevitch et al. |
| 8,631,489 | B2 | 1/2014 | Antonakakis et al. |
| 8,682,812 | B1 | 3/2014 | Ranjan |
| 8,694,642 | B2 | 4/2014 | Ulevitch et al. |
| 8,701,190 | B1 | 4/2014 | Chau et al. |
| 8,874,550 | B1 | 10/2014 | Soubramanien et al. |
| 9,172,716 | B2 | 10/2015 | Mugali, Jr. et al. |
| 9,185,127 | B2 | 11/2015 | Neou et al. |
| 9,191,393 | B2 | 11/2015 | Tovar |
| 9,215,123 | B1 | 12/2015 | Fears et al. |
| 9,356,942 | B1 | 5/2016 | Joffe |
| 9,467,461 | B2 | 10/2016 | Balderas |
| 9,722,970 | B2 | 8/2017 | Prince et al. |
| 9,729,413 | B2 | 8/2017 | Cook et al. |
| 9,807,110 | B2 | 10/2017 | Harlacher et al. |
| 9,843,601 | B2 | 12/2017 | Paugh et al. |
| 10,084,814 | B2 | 9/2018 | Fakeri-tabrizi et al. |
| 10,164,989 | B2 | 12/2018 | Paugh et al. |
| 2005/0240576 | A1 | 10/2005 | Piscitello et al. |
| 2006/0010215 | A1 | 1/2006 | Clegg et al. |
| 2006/0036598 | A1 | 2/2006 | Wu et al. |
| 2006/0149674 | A1* | 7/2006 | Cook .................... G06Q 20/40 705/44 |
| 2007/0028301 | A1* | 2/2007 | Shull .................... G06F 21/552 726/22 |
| 2007/0088550 | A1 | 4/2007 | Filev et al. |
| 2008/0028463 | A1 | 1/2008 | Dagon et al. |
| 2008/0082662 | A1 | 4/2008 | Dandliker et al. |
| 2008/0133540 | A1 | 6/2008 | Hubbard et al. |
| 2008/0155694 | A1 | 6/2008 | Kwon et al. |
| 2008/0184357 | A1 | 7/2008 | Drako et al. |
| 2008/0201401 | A1 | 8/2008 | Pugh et al. |
| 2009/0043720 | A1 | 2/2009 | Reznik et al. |
| 2009/0055929 | A1 | 2/2009 | Lee et al. |
| 2009/0083413 | A1 | 3/2009 | Levow et al. |
| 2009/0254989 | A1 | 10/2009 | Achan et al. |
| 2009/0265786 | A1 | 10/2009 | Xie et al. |
| 2009/0282028 | A1 | 11/2009 | Subotin et al. |
| 2009/0323550 | A1 | 12/2009 | Buckman et al. |
| 2010/0037314 | A1* | 2/2010 | Perdisci ............. H04L 63/1416 726/22 |
| 2010/0125911 | A1 | 5/2010 | Bhaskaran |
| 2010/0235915 | A1 | 9/2010 | Memon et al. |
| 2010/0257024 | A1 | 10/2010 | Holmes et al. |
| 2010/0281536 | A1 | 11/2010 | Richards et al. |
| 2011/0035469 | A1 | 2/2011 | Smith et al. |
| 2012/0042381 | A1* | 2/2012 | Antonakakis ....... H04L 61/1511 726/22 |
| 2012/0158626 | A1* | 6/2012 | Zhu ........................ G06F 21/56 706/13 |
| 2012/0198549 | A1* | 8/2012 | Antonakakis ....... H04L 61/1511 726/22 |
| 2012/0259954 | A1 | 10/2012 | McCarthy et al. |
| 2012/0304244 | A1* | 11/2012 | Xie ........................ G06F 21/00 726/1 |
| 2012/0324113 | A1 | 12/2012 | Prince et al. |
| 2013/0014253 | A1 | 1/2013 | Neou et al. |
| 2013/0031626 | A1 | 1/2013 | Kim et al. |
| 2013/0117282 | A1 | 5/2013 | Mugali, Jr. et al. |
| 2014/0068775 | A1 | 3/2014 | Ward et al. |
| 2014/0215628 | A1 | 7/2014 | Yan |
| 2015/0074221 | A1 | 3/2015 | Kuparinen et al. |
| 2015/0074807 | A1 | 3/2015 | Turbin |
| 2015/0128263 | A1* | 5/2015 | Raugas ............... H04L 63/1408 726/23 |
| 2016/0065534 | A1 | 3/2016 | Liu et al. |
| 2016/0065535 | A1 | 3/2016 | O'Leary et al. |
| 2016/0065611 | A1 | 3/2016 | Fakeri-Tabrizi et al. |
| 2016/0099961 | A1 | 4/2016 | Paugh et al. |
| 2016/0294852 | A1 | 10/2016 | Hagen |
| 2017/0142150 | A1 | 5/2017 | Burns et al. |
| 2017/0163754 | A1 | 6/2017 | Johnson |
| 2018/0176241 | A1 | 6/2018 | Manadhata et al. |
| 2018/0183830 | A1 | 6/2018 | Wessels et al. |

OTHER PUBLICATIONS

U.S. Appl. No. 14/937,656, filed Nov. 10, 2015.
U.S. Appl. No. 14/943,908, filed Nov. 17, 2015.
U.S. Appl. No. 16/107,627, filed Aug. 21, 2018.
U.S. Appl. No. 16/197,606, filed Nov. 21, 2018.
U.S. Appl. No. 16/274,351, filed Feb. 13, 2019.
U.S. Appl. No. 14/937,616, filed Nov. 10, 2015.
U.S. Appl. No. 14/937,656, Non-Final Rejection dated Mar. 9, 2018, 50 pages.
U.S. Appl. No. 14/937,656, Final Rejection dated Dec. 19, 2018, 49 pages.
U.S. Appl. No. 14/937,616, Non-Final dated Apr. 6, 2018, 18 pages.
U.S. Appl. No. 16/107,627, Non-Final Office Action dated Dec. 14, 2018, 21 pages.
U.S. Appl. No. 14/937,656, Final Rejection dated Aug. 8, 2019, 38 pages.

\* cited by examiner

SYSTEM FOR DOMAIN REPUTATION SCORING

CROSS-REFERENCE TO RELATED APPLICATIONS

The present application is a continuation-in-part of, and claims the priority benefit of, U.S. patent application Ser. No. 13/177,504 filed on Jul. 6, 2011, entitled "Network Protection Service," now U.S. Pat. No. 9,185,127 issued on Nov. 10, 2015, the disclosure of which is incorporated herein by reference in its entirety for all purposes.

TECHNICAL FIELD

This disclosure relates to processing Domain Name System (DNS) data. More specifically, this disclosure relates to systems and methods for domain name scoring.

BACKGROUND

In computer networking, domain names help identifying locations where certain information or service can be located on a public or private network. Domain names are typically formed according to rules and procedures of the DNS. Domain names can be used for various naming and addressing purposes. In general, a domain name can be resolved to an Internet Protocol (IP) resource, such as a personal computer, a server hosting website pages, or a website page or service. Thus, the DNS can allow translating domain names (such as "www.example.com") into the corresponding IP address (such as "123.4.56.78") needed to establish communications over the Internet.

Traditionally, DNS servers resolve (i.e., translate to IP addresses) domain names upon receiving DNS queries associated with domain names. When a DNS server receives a query from a client, the DNS server checks if it can answer the DNS query based on data available to the DNS server. If the queried domain name matches a corresponding resource record in a local cache, the DNS server can answer without querying any other DNS servers. If no local record exists for the queried domain name, the DNS server checks if it can resolve the domain name using historical data. If a match is found, the DNS server answers based on the historical data. If the queried domain name does not find a match at the DNS server level, the query process can continue with assistance from other DNS servers.

One of the important tasks for Internet Service Providers (ISPs), malware protection providers and many other systems is to identify malicious network activities such as web-based security threats or botnets. Malicious code authors use a variety of methods to prevent authorities and users from identifying security threat sources. These methods can range from adaptive computer coding techniques to changing command and control (C&C) server locations to different infected computers. It may be difficult to detect certain malware operations, while the costs of continuously maintaining security measures, such as honeypots, and related infrastructure are high. Thus, fleeting and evolving nature of various web-based security threats requires new methods of identification of malicious servers and clients.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is concerned with computer-implemented methods and systems for domain name scoring. In some example embodiments, the method includes receiving a request to provide a reputation score of a domain name, receiving input data associated with the domain name, extracting a plurality of features from the input data and the domain name, generating a feature vector based on the plurality of features, and calculating the reputation score of the domain name by a machine-learning classifier based on a graph database. The graph database can include feature vectors created based on information characterizing one or more of the following: a plurality of reference domain names, a plurality of servers, a plurality of domain name owners, a plurality of Classless Inter Domain Routing (CIDR) records, and a plurality of Autonomous System Number (ASN) records. The reputation score can represent a likelihood that the domain name is associated with malicious activity.

In certain embodiments, the machine-learning classifier can be trained using the following operation: receiving input data associated with the plurality of reference domain names, extracting a plurality of trusted features from the input data associated with the plurality of reference domain names, generating the graph database based on the plurality of trusted features and the plurality of reference domain names, and training the machine-learning classifier based on the graph database.

In certain embodiments, the plurality of features can include one or more of the following: one or more features associated with network parameters of the domain name, one or more features associated with an owner of the domain name, one or more features associated with characteristics of the domain name, one or more features associated with a web traffic related to the domain name, one or more features associated with clients, which accessed the domain name, one or more features associated with Doman Name System (DNS) queries, and one or more features associated with DNS responses. In some embodiments, the features associated with network parameters include at least one address record, a time-to-live (TTL) parameter, a name server (NS) record, a Classless Inter Domain Routing (CIDR) record, and an Autonomous System Number (ASN). The features associated with the owner of the domain name can include WHOIS information. The features associated with characteristics of the domain name can include semantic characteristic of the domain name. The features associated with the web traffic can include a query count (QC) associated with the domain name, a client count (CC) associated with the domain name, a network count (NC) associated with the domain name, and a rank associated with the domain name.

In certain embodiments, the features can are organized in a hierarchy structure, which includes one or more super-features. Each of the super-features includes one or more meta-features, and each of the meta-features includes one or more features selected from the plurality of features.

In certain embodiments, the input data associated with the domain name can include one or more of the following: a DNS zone file associated with the domain name, DNS logs associated with the domain name, DNS queries associated with the domain name, WHOIS information associated with the domain name, authoritative DNS traffic associated with the domain name, and security information associated with the domain name.

According to another aspect of this disclosure, there is provided a computer-implemented method for domain name scoring, which includes: receiving a request to provide a reputation score for a domain name, receiving input data associated with the domain name, extracting a plurality of features from the input data and the domain name, generating a feature vector based on the plurality of features, and calculating the reputation score of the domain name by finding a similarity of the feature vector with one of domain name clusters in a graph database. In certain embodiments, the domain name clusters can be generated using the following operations: receiving input data associated with the plurality of reference domain names, extracting a plurality of trusted features from the input data associated with the plurality of reference domain names, generating the graph database based on the plurality of trusted features and the plurality of reference domain names, and generating the domain name clusters in the graph database.

According to yet another aspect of this disclosure, there is provided a computer-implemented method for domain name scoring. The method may comprise receiving a request to provide a reputation score of a domain name, receiving input data associated with the domain name, extracting a plurality of features from the input data and the domain name, generating a feature vector based on the plurality of features, calculating a first reputation score of the domain name by a machine-learning classifier based on a graph database, calculating a second reputation score of the domain name by finding a similarity of the feature vector with one of domain name clusters in the graph database, and providing the reputation score of the domain name based on a combination of the first reputation score and the second reputation score.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EXAMPLARY EMBODIMENTS

Figure 1:
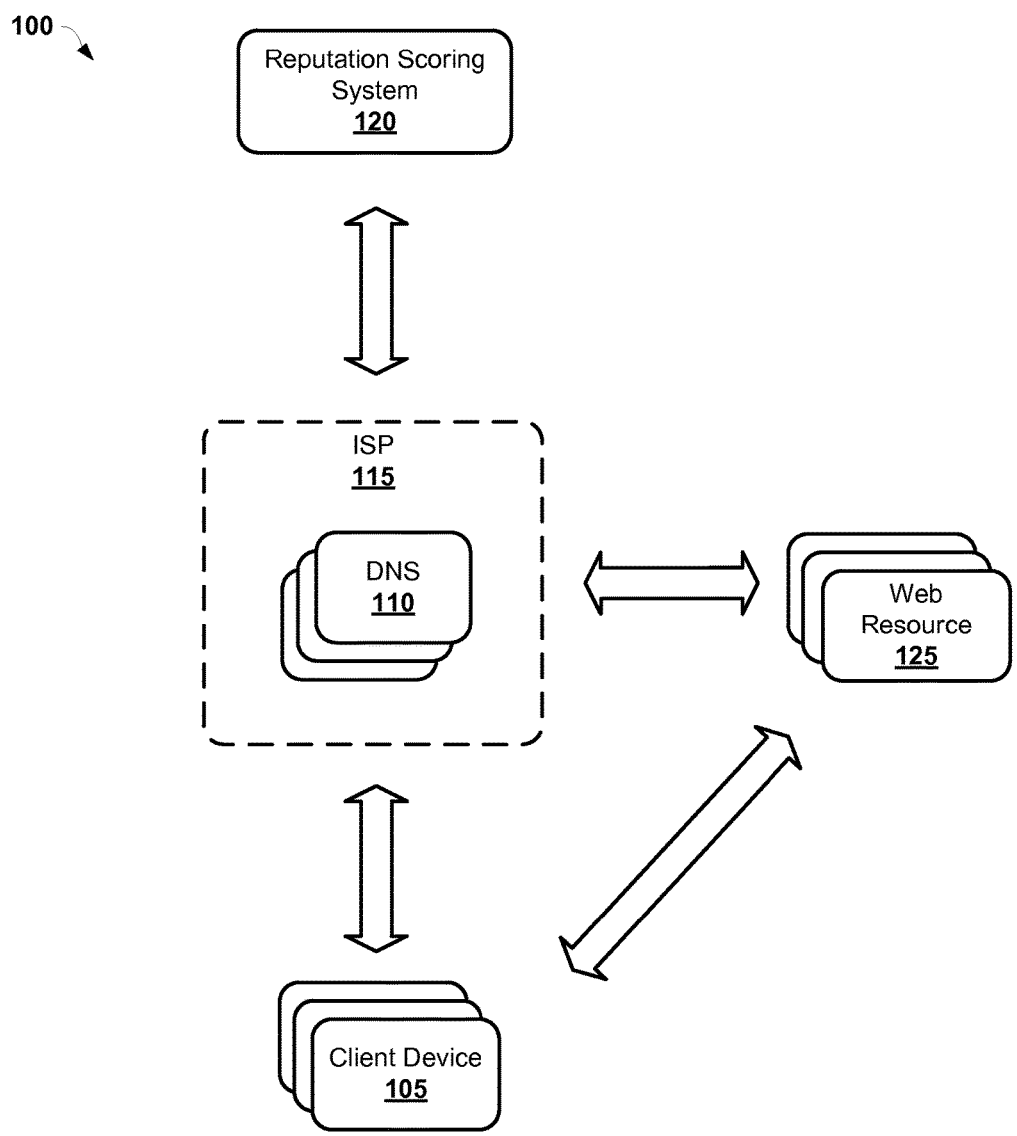
FIG. 1 is a block diagram of an example computer network environment suitable for practicing methods for domain name scoring.

The technology disclosed herein is concerned with methods for domain name scoring. The scoring information can indicate a probability that certain domain names or clients are associated with malicious activity. Overall, the present technology associate a variety of data sources in a graph database, where an inference can be made about a particular domain name or a client Internet Protocol (IP) address without direct knowledge about its maliciousness. More specifically, this technology provides for a framework of connecting multiple features characterizing web traffic, DNS queries, DNS responses, traffic patterns, domain names, client IP addresses, server IP addresses, or other information into a graph. The graph database is then used with an algorithm, such a clustering algorithm or a machine-learning classifier, to propagate "maliciousness" from graph nodes that are known to be malicious to nodes, where direct information is not yet available. Thus, this technology combines information about known infected IP addresses, malicious websites, network information, suspect domain owners, or domain query log data to produce a searchable graph with directly obtained information about domain names, as well as with inferred information about domain names based on the "surroundings" in the graph. This approach provides an evolving system, where it is easy to add a new feature and adjust the algorithms to accommodate a change. This flexibility allows for fast reaction time to any new feature vector or malware innovation.

Multiple experiments have shown that the present technology can be successfully used in detecting various web-based malicious activities and gain insights into domain names or clients involved in malicious activities. Some examples of malicious activities, which can be detected with this technology, include malware residing at end subscribers or servers, C&C servers for malware, phishing websites, spam destination websites, fast flux domains (with rapidly changing IP address through DNS records), Potentially Unwanted Application (PUA) malware, malware changing DNS data on target computers, suspiciously high rank websites, suspicious or malware infected Content Delivery Network (CDN) domain names, malicious dynamic DNS servers, malicious public hosting services, malicious Bitcoin related domain names, and so forth.

The overall process for domain reputation scoring is based on creating and maintaining a graph database using a wide range of unique input data aggregated from multiple internal or external sources. This input data may include one or more DNS zone files, DNS logs, DNS queries, DNS responses, DNS records, WHOIS information, authoritative DNS traffic, security information associated with domain names or clients, and so forth. The input data can be processed to retrieve or calculate multiple features. These features characterize domain name related parameters or client related parameters. For example, the features can include network-based features, WHOIS-based features, domain name based features, sub-domain name features, web traffic-based features, evidence-based features, client-based features, response-based features, and so forth.

These features can be hierarchically organized into a structure having one or more Super-Features, one or more Meta-Features, and one or more features. In this structure, a Super-Feature includes one or more Meta-Features. Each Meta-feature includes one or more features that are discussed above. For example, a Time-To-Live (TTL) meta-feature belongs to Network Super-Feature. At the same time, the TTL meta-feature can include different features such as a median value, a standard deviation value, one or more distinct TTL values, a number of TTL changes, percentage usage of specific TTL ranges, and the like.

The graph database can be created based on these Super-Features, Meta-Features, and features, which are all related to certain reference domain names (so-called "ground truth"). The graph database can be then used for training of a machine-learning algorithm to create a predictive model. The predictive model can be propagated forward to untrusted or unknown domain names to infer more information about them based on similarity. In other embodiments, the similarity can be determined by using a data clustering algorithm that generates clusters of reference domain names based on the graph database. In yet more embodiments, the machine-learning algorithm and data clustering algorithm can be combined. As a result, when new domain name information is supplied to the predictive model of the machine-learning algorithm and applied to the data clustering algorithm, the output information is generated which includes a reputation score of the domain name. The reputation score of the domain name can reflect a probability value (e.g., between 0 and 1) that the domain name is associated with any known malicious activity.

In some embodiments, certain features in the graph database can be associated a domain name rank, which can be aggregated from an external source, such as Alexa or Google PageRank, or calculated internally based on certain metric values associated with domain names. These metric values can include a query count (QC), a client count (CC), and a network count (NC). When the multiple metric values are obtained from DNS related information, the rank can be calculated as follows: $Rank = NC \cdot CC \cdot (1 + \log(QC))$.

In the present technology, time-based and frequency-based insights can also be inferred and used as features in the graph database. This time-based and frequency-based information can be retrieved from DNS resolution data based on DNS query timestamps.

The relationships between domain names can be also measured and used as a feature in the graph database. For example, a word2vec algorithm can be used to measure the correlation between domain names and hosting servers, name servers and other network items.

The present technology can also assign a high suspect score to clients or domain names that product unusually large number of new core domains in DNS logs within certain time periods. This statistical information, including time-based or frequency-based patterns reflecting the appearance of certain domain names, DNS queries, DNS responses, or related information within DNS data fragments, can be used as one or more features.

Moreover, some features used in the present technology can use security feeds obtained from internal or external sources. The security feeds can indicate that certain domain names or clients are infected or otherwise associated with malicious activities. However, the opposite can also be true, when the security feeds indicate that certain domain names or clients are not infected or otherwise are not associated with malicious activities.

In some embodiments, DNS response information from caching and authoritative servers can be used as the input data to provide additional metrics about domain names. Similar to above, the DNS response information can be used for feature extraction and then directly used for analysis of different attacks such as amplification attacks.

The present technology can also combine various algorithms to calculate domain name probability scores, which can include a machine-learning classifier (also referred herein to as supervised learning) and a graph analysis approach (also referred herein to as unsupervised learning), to generate both a primal and advanced maliciousness scores. In addition, the graph-based approach of this technology can be helpful for bootstrapping and tracking suspicious clients, as well as clustering new domain names based on different DRS features. The graph analysis approach can be helpful for malicious propagation techniques, random walk/page-rank analysis, and so forth. The combination of these two algorithms provides high reliability in detecting malicious activities of various types and nature.

The use of graph database allows for capturing multiple relationships between domain names and clients and further allows for the maliciousness propagation to be applied to the graph-based information. Therefore, the graph database is well suitable due to the nature of high locality, but high node connectivity depth. This makes graph database significantly faster for queries than a classical, Structural Query Language (SQL) database that does not represent the nature of DNS/IP relationships.

For purposes of this patent document, it is important to provide definitions of certain terminology as used herein. The terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Furthermore, the term "DNS" shall have its ordinary meaning of Domain Name System, which represents a hierarchical distributed naming system for computers, servers, content, services, or any resource available via the Internet or a private network. The terms "domain" and "domain name" shall be given its ordinary meaning such as a network address to identify the location of a particular website page, web resource, file, content, service, computer, server, and so forth. In certain embodiments, domain names can be identified by one or more IP addresses. Each domain name can be made up of a series of character strings separated by dots. The right-most label in a domain name is known as the "top-level domain" (TLD) such as ".com," ".org" and the like. Each top-level domain supports second-level domains, such as the "nominum" level in "www.nominum.com." Each second-level domain (2LD) can include a number of third-level domains located immediately to the left of the second-level domain, e.g. the "www" level in "www.nominum.com." There can be additional level domains as well, with virtually no limitation. For example, a domain with additional domain levels could be "www-.photos.nominum.com."

In this disclosure, the term "core domain name" shall mean a parent domain, which is the combination of a second-level domain and a top-level domain, e.g. "nominum.com." The term "subdomain name" shall mean one or more additional domain levels, hostnames, and the like. Further, the term "Fully Qualified Domain Name" or FQDN shall mean the complete domain name for a specific computer, server, or host. The FQDN may consist of two parts: a subdomain name (hostname) and a core domain name. The term "CIDR" shall mean a Classless Inter Domain Routing. A CIDR block is an Internet Protocol (IP) v4 or v6 address and a decimal number signifying the number of bits in the network portion of the address. The size of the routing prefix dictates the size of the subnet. For example, a CIDR block 192.168.100.0/22 represents the 1024 addresses from 192.168.100.0 to 192.168.103.255.

The term "reference domain name" shall mean any of a domain name, subdomain name, FQDN, which is known to have a predetermined characteristic. For example, the "reference domain names" can include both domain names known to be associated with a malicious activity and domain names known not to be associated a non-malicious activity.

The term "ASN" shall mean Autonomous System Number, where the term "autonomous system" (AS) means a collection of connected IP routing prefixes under the control of one or more network operators on behalf of a single administrative entity or domain that presents a common, clearly defined routing policy to the Internet. For example, ASN number AS7922 is registered by Comcast Cable Communications, Inc.

The term "RHDN" shall mean Related Historic Domain Names, which is a set of domain names that historically were associated with the same server IP address. Thus, for a given IP address or a set of IP addresses, RHDN returns a set of domain names that have resolved to these IP addresses at some point in their history.

The term "RHIP" shall mean Related Historic IPs. Thus, for a given domain name or a set of domain names, RHIP returns the set of routable IP addresses that these domain names have resolved to at some point in the past. For example, for each FQDN, there can be provided a set of related server IPs, called RHIP, which is a collection of server IPs that various higher level subdomains resolve to, or mathematically: RHIP(d)=U A(d), A(3LD(d)), A(2LD (d)), where d is a domain, A(d) is a server IP.

The term "query count" (QC) shall mean a number of instances or a frequency of individual DNS queries associated with a particular domain name, which appear or present in a given data set (e.g., in a given DNS data fragment). The term "client count" (CC) shall mean a number of instances or a frequency of individual DNS queries associated with a particular client or user, which appear or present in a given data set with respect to one or more domain names. The term "network count" (NC) shall mean a number of instances or a frequency of individual DNS queries associated with a particular network, such as a local area network (LAN) or local network architecture, which appear or present in a given data set with respect to one or more domain names.

In some embodiments, the term "probability score" shall mean a numerical representation of probability that a given domain name or client is associated with one or more malicious activities. Alternatively, the term "probability score" may mean a numerical representation of probability that a given domain name or client is not associated with any malicious activities. The numerical representation can be represented as a single number, vector, data array, or matrix.

The term "graph" shall mean an abstract data type. A graph data structure may comprise a finite set of nodes, together with a set of unordered pairs of these nodes for an undirected graph or a set of ordered pairs for a directed graph. These pairs are "edges" for an undirected graph and as "arrows" for a directed graph. The nodes may be part of the graph structure, or may be external entities represented by indices or references. The term "graph database" shall mean a database that uses graph structures with nodes, edges and properties to represent and store data. Thus, the graph database can represent relationships between domain names, clients, servers, and other network elements, based on features of these items. The term "feature" shall mean a certain characteristic or parameter associated with a node in a graph. For example, features can include network-based features, WHOIS-based features, domain name based features, subdomain name features, web traffic-based features, evidence-based features, client-based features, response-based features, and so forth. These features can be hierarchically organized into a structure having one or more Super-Features and one or more Meta-Features as described above.

The term "WHOIS" shall mean is a query and response protocol that is used for querying databases that store the registered users or assignees of an Internet resource, such as a domain name, an IP address block, or an autonomous system, but is also used for a wider range of other information. For example, WHOIS information can include domain name owners, domain name administrators, registration dates, expiration dates, and so forth.

The term "DNS zone" shall mean any distinct, contiguous portion of the domain name space in the DNS for which administrative responsibility has been delegated to a single manager. The domain name space of the Internet can be organized into a hierarchical layout of subdomains below the DNS root domain. The individual domains of this tree may serve as delegation points for administrative authority and management. However, fine-grained boundaries of delegation can be desirable to implement so that multiple sub-levels of a domain may be managed independently. Therefore, the domain name space is partitioned into DNS zones for this purpose. Thus, a DNS zone starts at a domain and extends downward in the tree to the top-level of subdomains where other DNS zones start. Accordingly, a DNS zone is a subset, often a single domain, of the hierarchical domain name structure of the DNS.

The term "DNS zone file" or simply "zone file" shall mean a file that describes a DNS zone. The DNS zone file may include mappings between domain names and IP addresses and other resources, organized in the form of text representations of resource records (RR). A DNS zone file may be either a DNS master file, authoritatively describing a zone, or it may be used to list the contents of a DNS cache. The term "DNS logs" shall mean log files that include DNS queries and DNS responses.

Referring now to the drawings, various embodiments will be described, wherein like reference numerals represent like parts and assemblies throughout the several views. It should be noted that the reference to various embodiments does not limit the scope of the claims attached hereto. Additionally, any examples set forth in this specification are not intended to be limiting and merely set forth some of the many possible embodiments for the appended claims.

FIG. 1 shows a block diagram of an example computer network environment 100 suitable for practicing the methods for domain name scoring as described herein. It should be noted, however, that the environment 100 is just one example, and simplified embodiment provided for illustrative purposes and reasonable deviations of this embodiment are possible as will be evident for those skilled in the art.

As shown in FIG. 1, there is provided at least one client device 105 (also referred herein to as "client" for simplicity). The client device 105 is generally any appropriate computing device having network functionalities allowing communicating under any existing IP protocols (e.g., IPv4, IPv6). For these ends, each client device 105 can be associated with an IP address. Some examples of the client devices 105 include, but are not limited to, a computer (e.g., laptop computer, tablet computer, desktop computer), server, cellular phone, smartphone, gaming console, multimedia system, intelligent television device, set-top box, infotainment system, in-vehicle computing device, informational kiosk, robot, smart home computer, home appliance device, Internet-of-Things (IoT) device, Internet-of-Everything (IoE) device, sensor, thermostat, software application, computer operating system, modem, router, and so forth. The environment 100 may include multiple client devices 105, but not necessarily.

The client devices 105 can be operated by users or they can be operated autonomously (e.g., automatically checking for updates on a network resource). Thus, the client device 105 can make certain client inquiries to the computer network environment 100, such as a request to open a website page hosted by a web resource 125, download a file from the web resource 125, and so forth. A client inquiry may include a DNS query associated with a domain name (e.g., in the form of "www.nominum.com"), which requires the resolution by a DNS server into one or more corresponding IP addresses associated with the web resource 125. The DNS query initiated by the client device 105 can be transmitted to a recursive DNS server, or simply, DNS 110, which can be associated with a particular ISP 115. The ISP 115 can include a plurality of DNSs 110. For purposes of this patent document, the terms "DNS query," "DNS inquiry," and "DNS request" may mean the same and therefore can be used interchangeably.

The DNS 100 resolves the DNS query and returns a DNS response with an IP address associated with the domain name of the DNS query. The IP address can be delivered to the client device 105. In certain embodiments, the DNS query includes the following data: an IP address of the client 105, a time stamp of the DNS inquiry, DNS query name (e.g., a domain name), and/or a DNS query type. The DNS data can be aggregated or stored in a cache of DNS 100.

Still referring to FIG. 1, there is shown a reputation scoring system 120 which implements the methods for domain name scoring as described herein. The reputation scoring system 120 may be implemented on a server, a plurality of servers or provide a cloud-based domain name scoring service. The reputation scoring system 120 can include hardware modules (e.g., decision-making logic, dedicated logic, programmable logic, application-specific integrated circuit (ASIC)), software modules (e.g., software run on a general-purpose computer system or a dedicated machine, microcode, computer instructions), or a combination of both. The reputation scoring system 120 is in operative communication with the ISP 115, including any devices of the ISP 115 such as one or more DNSs 110. In some embodiments, the reputation scoring system 120 can be integrated, combined or embedded into one or more ISPs 115 or into one or more DNSs 110.

The reputation scoring system 120 is configured to create, maintain and regularly update a graph database associated with domain names and optionally other network elements, including clients, name servers, autonomous systems, and so forth. The reputation scoring system 120 is also configured to implement a supervised learning algorithm and an unsupervised learning algorithm with respect to new unknown domain names and based on the graph database. The result of operation of the reputation scoring system 120 includes a reputation score calculated for a given domain name. The reputation score indicates a probability that the given domain name is malicious.

Figure 2:
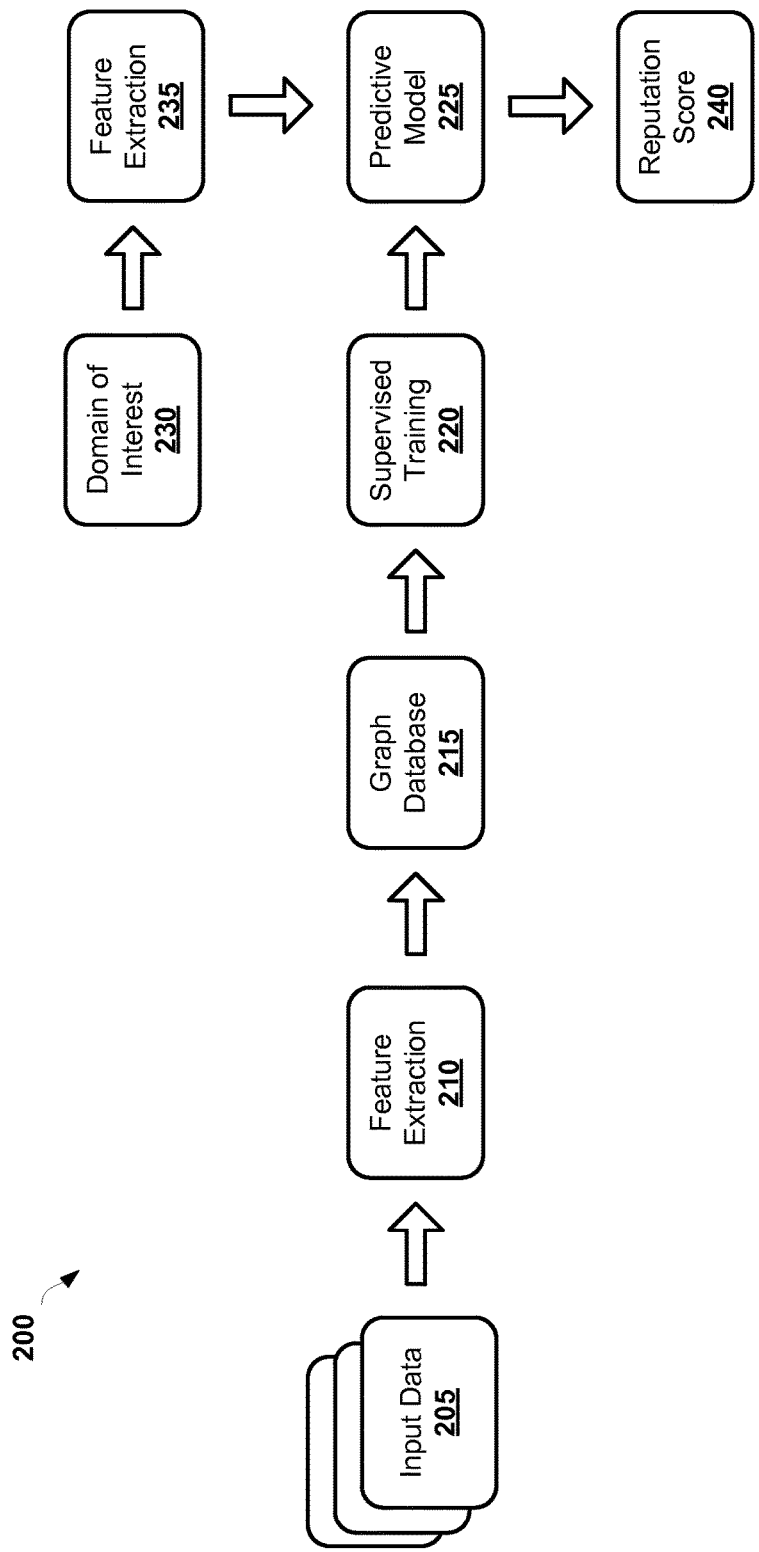
FIG. 2 is a simplified block diagram illustrating a supervised workflow for domain name scoring.

FIG. 2 shows a simplified block diagram 200 illustrating a supervised workflow for domain name scoring according to an example embodiment of this disclosure. The diagram 200 demonstrates that the reputation scoring system 120 receives input data for reference domain names at operation 205. The reference domain names mean that these domain names are known to be either malicious or non-malicious. In other words, the reference domain names provide the "ground truth" for the graph database. The input data associated with the reference domain names can include one or more of the following: (a) a security feed providing security information on maliciousness of certain domain names, clients, processes, and the like; (b) a DNS zone file; (c) an authoritative DNS traffic; (d) global traffic including DNS queries; (e) DNS logs; and (f) WHOIS information.

The reputation scoring system 120 processes the input data and extracts a plurality features at operation 210. The plurality of features can include one or more of the following: features associated with network parameters ("network-based" features), features associated with owners of domain names ("owner-based" features), features associated with characteristics of domain names ("name-based" features), features associated with a web traffic ("traffic-based" features), features associated with clients ("client-based" features), features associated with DNS queries, and features associated with DNS responses ("response-based" features). The above-described features can be hierarchy organized. For example, these features can be Meta-Features meaning that each of Meta-Feature includes one or more simple features. Each of the Meta-Features and each of the simple features can be associated with at least one domain name or client.

According to various embodiments, the "network-based" features can include one or more of the following: an IP address, NS address, Cname, CIDR, ASN, TTL, and so forth. Further, according to some embodiments, the "owner-based" features can include one or more of the following: owner information, administrator information, registration date, expiration date, and other WHOIS information. According to certain embodiments, the "name-based" features can include one or more of the following: semantic characteristics of domain names, string-based features (e.g., n-gram, TLD, CC-TLD, sub-domains, sub-domain distributions, n-gram ranks, entropy, DGA scores, percentage numerical char, LMS length, etc.) and sub-domain features (e.g., sub-domain count, sub-domain heterogeneity, etc.). In some embodiments, the "traffic-based" features can include one or more of the following: global statistical values (e.g., QC, CC, NC), Alexa rank, Google Page Rank, a rank calculated based on a proprietary algorithm as described herein. In some embodiments, the "client-based" features can include one or more of the following: client IP addresses that are associated with other infected or malicious client IP addresses, predictive DNS query patterns, isosynchronous DNS queries, and so forth. The "response-based" features can include one or more of the following: a response size, rcode, NXD, servefail, DNS query type, and so forth. In yet more embodiments, there can be provided "evidence-based" features obtained from external or internal lists, including or excluding path analysis.

The reputation scoring system 120 then aggregates the features extracted at operation 210 and builds (or updates) the graph database at operation 215. Thus, the graph database represents complex relationships between domain names, clients and other network elements. At operation 220, the reputation scoring system 120 uses the graph database to train a machine-learning classifier. Once the machine-learning classifier is trained, there is created a predictive model at operation 225, which allows the reputation scoring system 120 to propagate forward and learn about maliciousness of new domain names. In other words, the predictive model of trained machine-learning classifier is configured to determine similarity between a given domain name (or client) and a plurality of reference domain names (or trusted clients). The result of determination can be provided by the predictive model as a reputation score.

Thus, when the reputation scoring system 120 receives a request to provide a reputation score of a domain name of interest at operation 230, the reputation scoring system 120 obtains input data associated with the domain name of interest. Similar to above, the input data can include one or more of the following: (a) a security feed providing security information on maliciousness of certain domain names, clients, processes, and the like; (b) a DNS zone file; (c) an authoritative DNS traffic; (d) global traffic including DNS queries; (e) DNS logs; and (f) WHOIS information. At operation 235, the reputation scoring system 120 processes the input data and extracts one or more features of the domain name of interest. The reputation scoring system 120 can then produce a feature vector based on the plurality of features associated with the domain name of interest. The feature vector can be an aggregation of the features in the form of an algebra vector, data array or matrix. At operation 240, the reputation scoring system 120 calculates a reputation score of the domain name of interest by applying the predictive model of the machine-learning classifier based on the graph database. The reputation score can be then associated with the domain name of interest and delivered to an internal or external database, storage, memory, or service. In some embodiments, the reputation score can be visualized and shown to authorized users.

Figure 3:
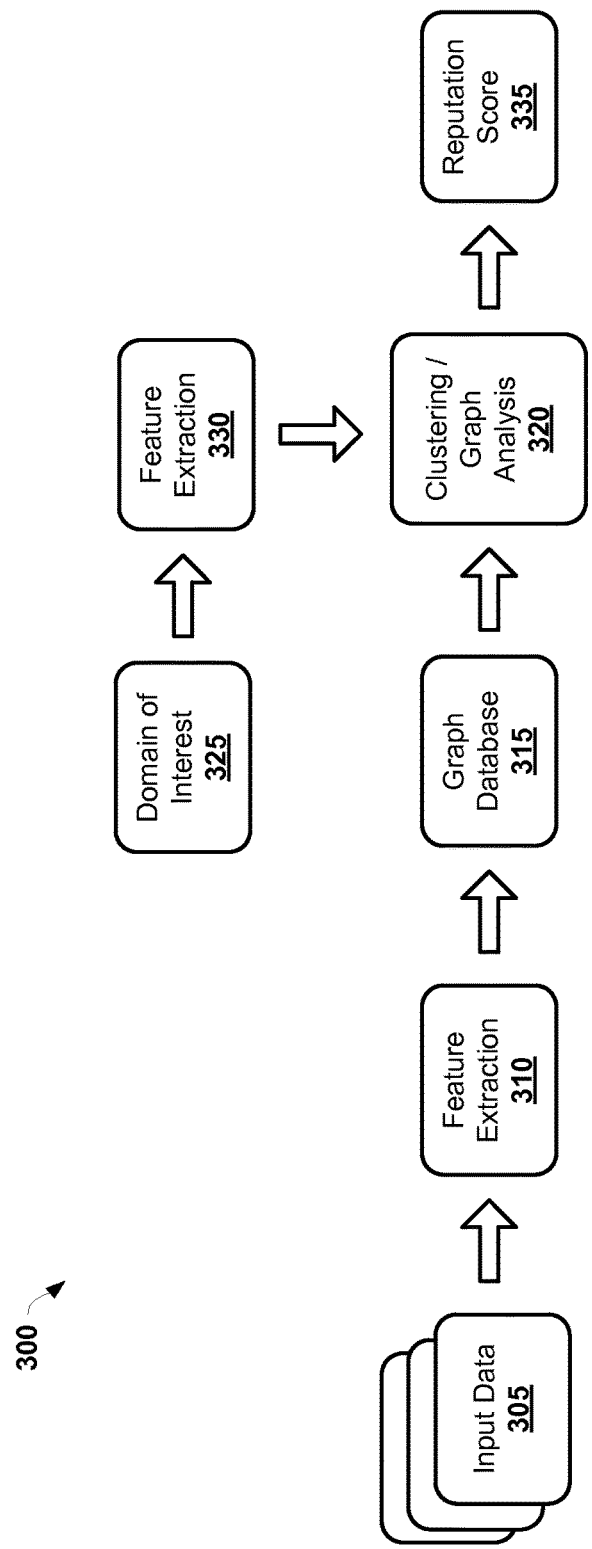
FIG. 3 is a simplified block diagram illustrating an unsupervised workflow for domain name scoring.

FIG. 3 shows a simplified block diagram 300 illustrating an unsupervised workflow for domain name scoring according to an example embodiment of this disclosure. As shown in this figure, the reputation scoring system 120 can receive input data for reference domain names at operation 305. The reference domain names mean that these domain names are known to be either malicious or non-malicious. In other words, the reference domain names provide the "ground truth" for the graph database. The input data associated with the reference domain names can include one or more of the following: (a) a security feed providing security information on maliciousness of certain domain names, clients, processes, and the like; (b) a DNS zone file; (c) an authoritative DNS traffic; (d) global traffic including DNS queries; (e) DNS logs; and (f) WHOIS information.

The reputation scoring system 120 processes the input data and extracts a plurality features at operation 310. The plurality of features can include one or more of the following: features associated with network parameters ("network-based" features), features associated with owners of domain names ("owner-based" features), features associated with characteristics of domain names ("name-based" features), features associated with a web traffic ("traffic-based" features), features associated with clients ("client-based" features), features associated with DNS queries, and features associated with DNS responses ("response-based" features). The above-described features can be hierarchy organized. For example, these features can be Meta-Features meaning that each of Meta-Feature includes one or more simple features. Each of the Meta-Features and each of the simple features can be associated with at least one domain name or client.

At operation 315, the reputation scoring system 120 aggregates the features extracted at operation 310 and builds (or updates) the graph database. Thus, the graph database represents complex relationships between domain names, clients and other network elements. At operation 320, the reputation scoring system 120 uses the graph database to generate clusters of domain names. Therefore, there can be provided one or more clusters associated with domain names known to be malicious or likely to be malicious. There can be also provided one or more clusters associated with domain names known to be non-malicious or likely to be non-malicious.

When the reputation scoring system 120 receives a request to provide a reputation score of a domain name of interest at operation 325, the reputation scoring system 120 obtains input data associated with the domain name of interest. Similar to above, the input data can include one or more of the following: (a) a security feed providing security information on maliciousness of certain domain names, clients, processes, and the like; (b) a DNS zone file; (c) an authoritative DNS traffic; (d) global traffic including DNS queries; (e) DNS logs; and (f) WHOIS information.

At operation 330, the reputation scoring system 120 processes the input data and extracts one or more features of the domain name of interest. The reputation scoring system 120 can then produce a feature vector based on the plurality of features associated with the domain name of interest. The feature vector can be an aggregation of the features in the form of an algebra vector, data array or matrix.

At operation 335, the reputation scoring system 120 calculates a reputation score of the domain name of interest by finding a similarity of the domain name of interest with one or more clusters generated at operation 320. The reputation score can be then associated with the domain name of interest and delivered to an internal or external database, storage, memory, or service. In some embodiments, the reputation score can be visualized and shown to authorized users.

Figure 4:
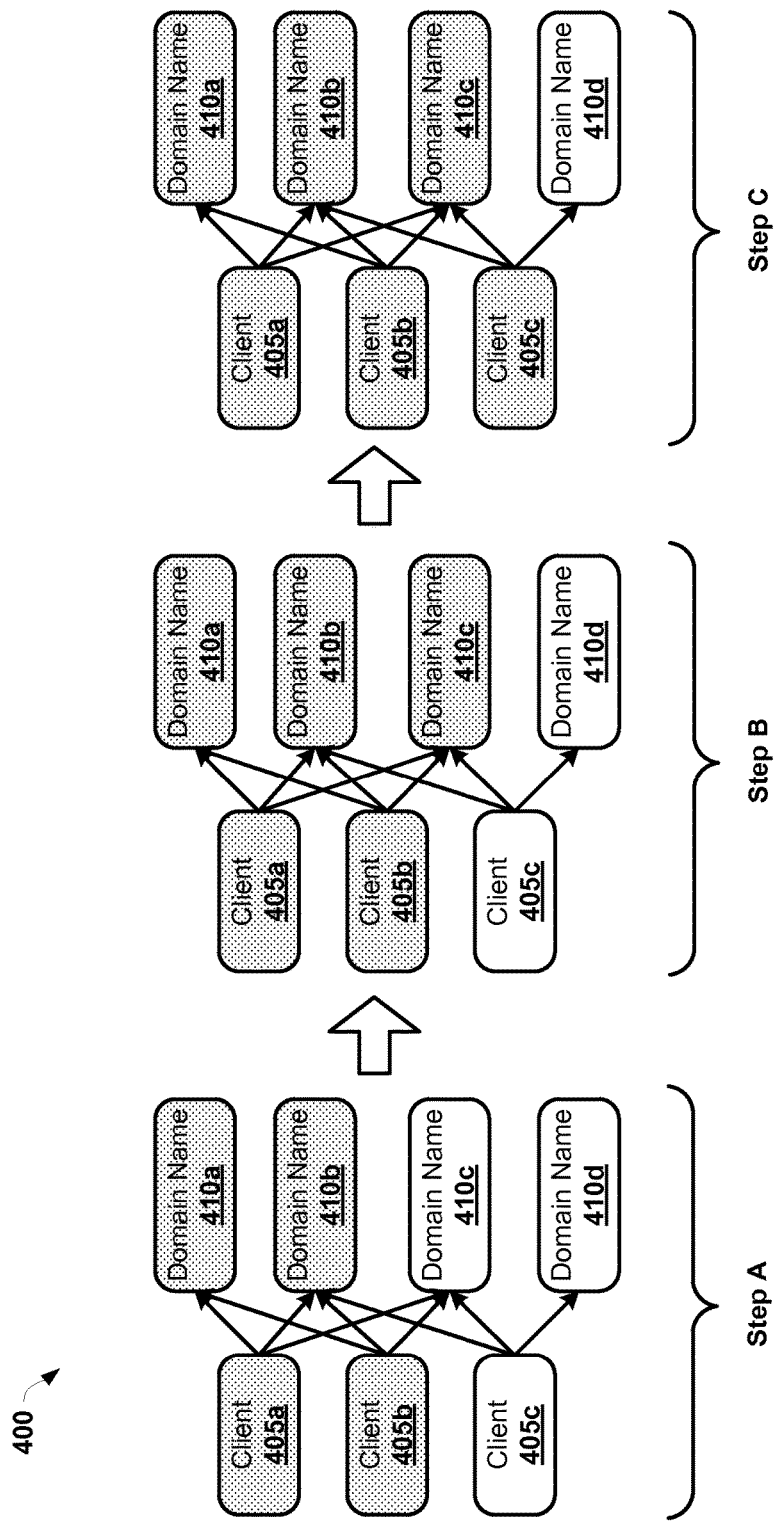
FIG. 4 is a simplified block diagram illustrating a propagation process for domain name scoring.

FIG. 4 shows a simplified block diagram 400 illustrating a propagation process for domain name scoring according to some embodiments of this disclosure. This process shows how the reputation scoring system 120 can make inferences about the maliciousness of domain names of interest and client IP addresses of interests using the predictive model or clustering analysis. At step A, the reputation scoring system 120 can receive and process previously available information integrated into a graph database that certain clients 405a, 405b are infected and certain domain names 410a, 410b are used for malicious purposes. The remaining clients 405c and the remaining domain names 410c, 410d are of interest since the reputation scoring system 120 does not have sufficient initial information to know if these clients and domain names of interest are malicious or not.

At step B, by using the fact that the client 405b is infected and frequently queries to an unclassified domain 410c, combined with other features, the reputation scoring system 120 makes an inference that the domain name 410c is also malicious or likely to be malicious (i.e., a corresponding reputation score can be assigned to the domain name 410c).

At step C, if the reputation scoring system 120 determines that client 405c is querying this newly classified as malicious domain name 410c, the reputation scoring system 120 can make a further inference that client 405c is also infected or likely to be malicious (i.e., a corresponding reputation score can be assigned to the client 405c).

Thus, this process can be repeated iteratively to identify domain names and clients that are likely to be malicious. Based on this information, previously created clusters of domain names can be updated, or clusters of domain names can be created to reflect the results of inferences. In some embodiments, this process can have certain additional checks and boundary conditions to produce a low number of false positives.

According to some embodiments of this disclosure, the reputation scoring system 120 can generate a rank of domain names to use it as one of the features. In one example embodiment, the process of ranking can be based on receiving or obtaining a rank of domain names from a third-party provider (e.g., Alexa®) or an internal database. In other embodiments, the rank can be calculated by the reputation scoring system 120 based on domain name metric values, which include at least one of QC, CC, and NC. When these metric values are obtained, they can be combined into a single metric, which is referred herein to as a rank. The rank can be a numerical representation and be calculated based on the following equation: Rank=NC·CC·(1+log(QC)). Those skilled in the art will appreciate that other equations can also be used for calculating the rank.

FIG. 4 illustrates only the maliciousness inference propagation between domain names and client IPs. However, it should be understood that other maliciousness inference propagations are possible. For example, maliciousness inference propagation can occur between Client IPs, domain names, server IPs, authoritative servers, CIDR block, and ASN (network infrastructure).

Figure 5:
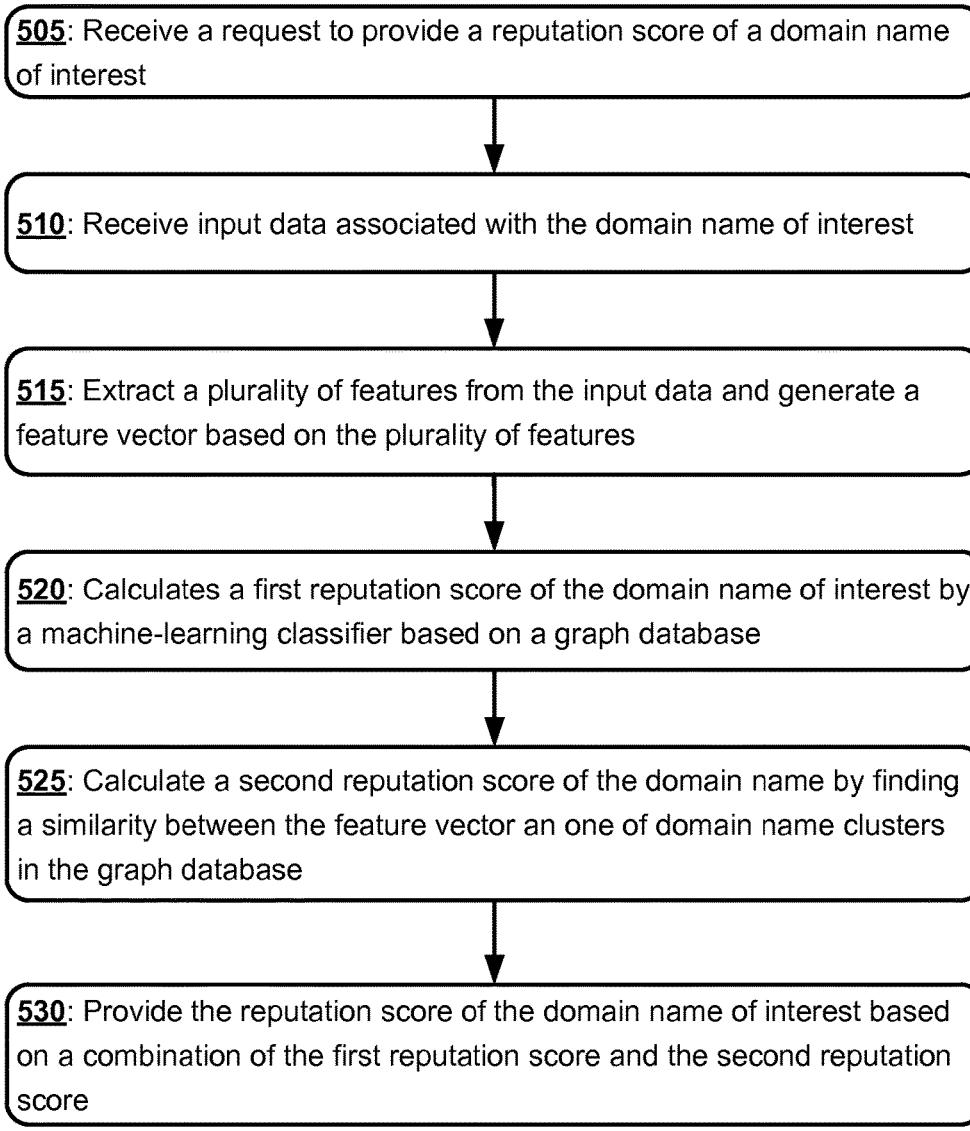
FIG. 5 is a flow chart illustrating a method for domain name scoring.

FIG. 5 is a flow chart of an example method 500 for domain name scoring according to some embodiments. The method 500 for domain name scoring may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the reputation scoring system 120 described above with reference to FIG. 1. Notably, the steps recited below may be implemented in an order different than described and shown in the figure. Moreover, the method 500 may have additional steps not shown herein, but which can be evident for those skilled in the art from the present disclosure. The method 500 may also have fewer steps than outlined below and shown in FIG. 5.

At operation 505, the reputation scoring system 120 receives a request to provide a reputation score of a domain name of interest. At this stage, we assume that a graph database for reference domain names is already created, a predictive model of a machine-learning classifier is already trained, and clusters of reference domain names are already generated.

At operation 510, the reputation scoring system 120 receives input data associated with the domain name of interest. The input data associated with the domain name of interest can include one or more of the following: (a) a security feed providing security information on maliciousness of certain domain names, clients, processes, and the like; (b) a DNS zone file; (c) an authoritative DNS traffic; (d) global traffic including DNS queries; (e) DNS logs; and (f) WHOIS information.

At operation 515, the reputation scoring system 120 extracts a plurality of features from the input data and the domain name of interest and generate a feature vector based on the plurality of features. The plurality of features can include one or more of the following: features associated with network parameters ("network-based" features), features associated with owners of domain names ("owner-based" features), features associated with characteristics of domain names ("name-based" features), features associated with a web traffic ("traffic-based" features), features associated with clients ("client-based" features), features associated with DNS queries, and features associated with DNS responses ("response-based" features). The above-described features can be hierarchy organized into one or more Super-Features, which include one or more Meta-Features, where each of Meta-Features has one or more features.

At operation 520, the reputation scoring system 120 calculates a first reputation score of the domain name of interest by the machine-learning classifier based on the graph database. In other words, the reputation scoring system 120 uses the supervised workflow, where the trained machine-learning classifier can propagate to the domain name of interest to infer its maliciousness. The graph database can includes feature vectors created based on information characterizing one or more of the following: a plurality of reference domain names, a plurality of servers, a plurality of domain name owners, a plurality of CIDR records, and a plurality of ASN records.

At operation 525, the reputation scoring system 120 calculates a second reputation score of the domain name by finding a similarity of the feature vector with one of domain name clusters in the graph database. In other words, the reputation scoring system 120 uses the unsupervised workflow. It shall be noted, however, that the operations 520 and 525 can be independent from each other. In some embodiments, only one of the operations 520, 525 can be performed. For example, in certain embodiments, the reputation scoring system 120 can determine which of the operations 520 or 525, i.e. the supervised workflow or unsupervised workflow, better suits for purposes of determining maliciousness of a certain domain name of interest. The determination can be based on the analysis of features, it can also depend on the size of the graph database, and many other factors. Once the determination is made, the reputation scoring system 120 can one of the operations 520, 525 to perform in the method 500. In other embodiments, both of the operations 520, 525 are performed in the method 500.

At operation 530, the reputation scoring system 120 provides the reputation score of the domain name of interest based on a combination of the first reputation score and the second reputation score. The reputation score can be then displayed or stored in a memory for further use. For example, reputation score can be used for updating the graph database.

In some embodiments, the reputation scoring system 120 can be exposed to external parties as a knowledge base, where it is possible to search for information on domain names. This can be to assist in security research, where domain names can be found on specific features, or for users and carriers to verify the security assessment for a particular domain. By allowing external users to comment on the available information, new facts may be discerned to adjust the reputation scores of domain names. With automated interfaces, the information can be provided directly into Business Support Systems (BSSs) or the like.

Figure 6:
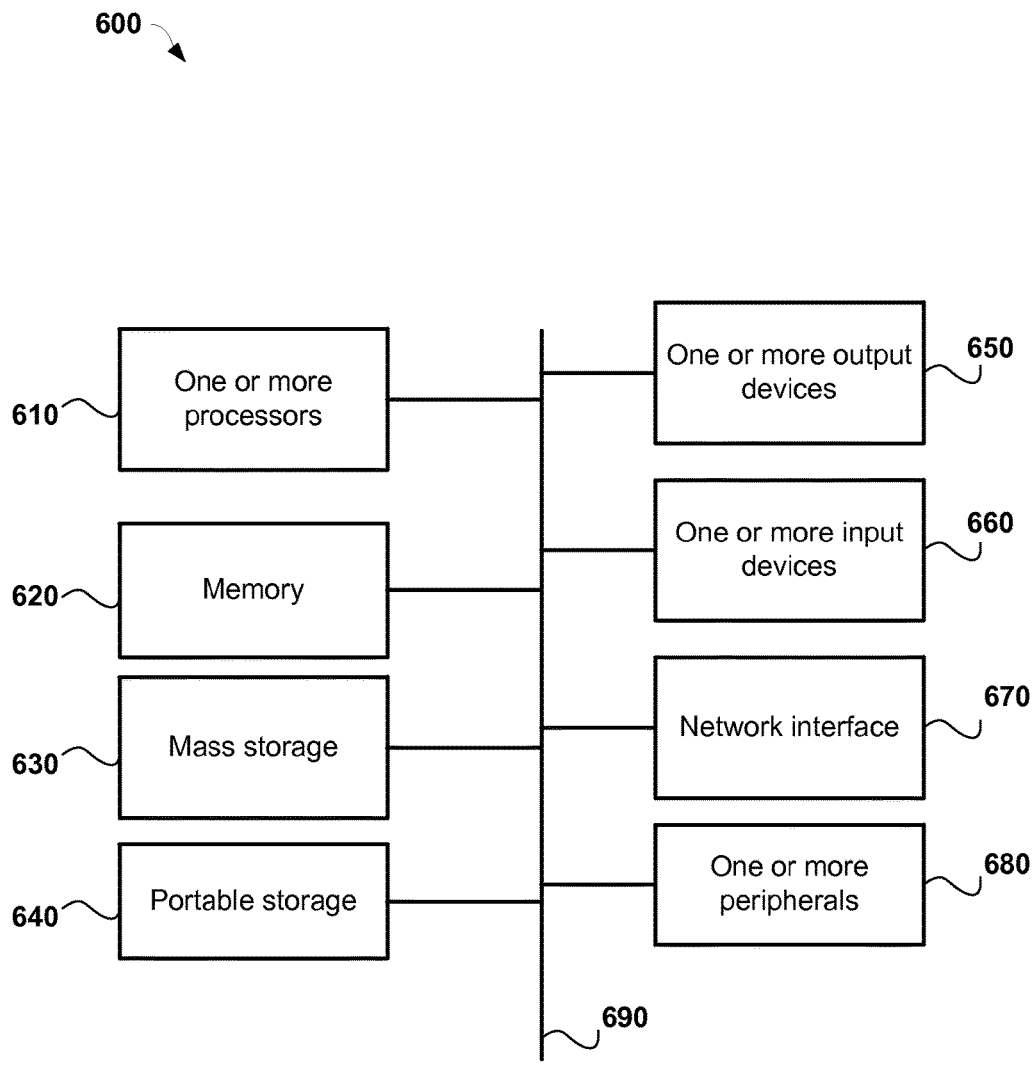
FIG. 6 is a computer system that may be used to implement the methods for for domain name scoring.

FIG. 6 illustrates an exemplary computing system 600 that may be used to implement embodiments described herein. The system 600 may be implemented in the contexts of the likes of client device 105, the DNS server 110, the reputation scoring system 120, and web resource 125. The computing system 600 may include one or more processors 610 and memory 620. Memory 620 stores, in part, instructions and data for execution by processor 610. Memory 620 can store the executable code when the system 600 is in operation. The system 600 may further include a mass storage device 630, portable storage medium drive(s) 640, one or more output devices 650, one or more input devices 660, a network interface 670, and one or more peripheral devices 680.

The components shown in FIG. 6 are depicted as being connected via a single bus 690. The components may be connected through one or more data transport means. Processor 610 and memory 620 may be connected via a local microprocessor bus, and the mass storage device 630, peripheral device(s) 680, portable storage device 640, and network interface 670 may be connected via one or more input/output (I/O) buses.

Mass storage device 630, which may be implemented with a magnetic disk drive or an optical disk drive, is a non-volatile storage device for storing data and instructions for use by a magnetic disk or an optical disk drive, which in turn may be used by processor 610. Mass storage device 630 can store the system software for implementing embodiments described herein for purposes of loading that software into memory 620.

Portable storage medium drive(s) 640 operates in conjunction with a portable non-volatile storage medium, such as a compact disk (CD) or digital video disc (DVD), to input and output data and code to and from the computer system 600. The system software for implementing embodiments described herein may be stored on such a portable medium and input to the computer system 600 via the portable storage medium drive(s) 640.

Input devices 660 provide a portion of a user interface. Input devices 660 may include an alphanumeric keypad, such as a keyboard, for inputting alphanumeric and other information, or a pointing device, such as a mouse, a trackball, a stylus, or cursor direction keys. Additionally, the system 600 as shown in FIG. 6 includes output devices 650. Suitable output devices include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripheral device(s) 680 may include any type of computer support device to add additional functionality to the computer system. Peripheral device(s) 680 may include a modem or a router. Peripheral device(s) 680 may also include input and output devices.

The components contained in the computer system 600 are those typically found in computer systems that may be suitable for use with embodiments described herein and are intended to represent a broad category of such computer components that are well known in the art. Thus, the computer system 600 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for domain name scoring have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A computer-implemented method for supervised domain name scoring, the method comprising:
    receiving a request to provide a reputation score of a particular domain name;
    receiving input data associated with the particular domain name;
    extracting a plurality of features from the input data and the particular domain name;
    generating at least one feature vector for the particular domain name, based on the plurality of features; and
    calculating the reputation score of the particular domain name using a generated predictive model based on a graph database;

the graph database comprising a plurality of nodes corresponding to IP addresses of clients and a plurality of nodes corresponding to domain names, which includes a node corresponding to the particular domain name, the graph database further comprising a plurality of arrows, each arrow connecting one of the plurality of client nodes to one of the plurality of domain name nodes, and each arrow representing a DNS request from the respective client about the respective domain name;

wherein said calculating the reputation score of the particular domain name using the generated predictive model based on the graph database comprises:
determining that a particular client is infected, and
based on the graph database, determining that the particular client has sent DNS queries about the particular domain with a threshold frequency, and
based on said determination and the at least one feature vector, classifying the particular domain name as likely malicious and assigning a corresponding reputation score to the particular domain name.

2. The method of claim 1, further comprising: receiving input data associated with a plurality of reference domain names, the reference domain names being known to be either malicious or non-malicious;
extracting a plurality of trusted features from the input data associated with the plurality of reference domain names;
generating the graph database based on the plurality of trusted features and the plurality of reference domain names; and
training a machine-learning classifier based on the graph database;
generating the predictive model using the machine-learning classifier.

3. The method of claim 1, wherein the reputation score represents a probability that the particular domain name is associated with malicious activity.

4. The method of claim 1, wherein the plurality of features are organized in a hierarchy structure and the plurality of features includes one or more features associated with network parameters of the particular domain name, one or more features associated with an owner of the particular domain name, one or more features associated with characteristics of the particular domain name, one or more features associated with a web traffic related to the particular domain name, or one or more features associated with clients that accessed the particular domain name.

5. The method of claim 4, wherein the plurality of features further includes features associated with Doman Name System (DNS) queries or DNS responses.

6. The method of claim 4, wherein the one or more features associated with network parameters of the particular domain name include at least one address record, a time-to-live (TTL) parameter, a name server (NS) record, a CIDR record, and an ASN record.

7. The method of claim 4, wherein the one or more features associated with the owner of the particular domain name include WHOIS information.

8. The method of claim 4, wherein the one or more features associated with characteristics of the particular domain name include semantic characteristics of the particular domain name.

9. The method of claim 4, wherein the one or more features associated with the web traffic include a query count (QC) associated with the particular domain name, a client count (CC) associated with the particular domain name, a network count (NC) associated with the domain name, and a rank associated with the particular domain name.

10. The method of claim 1, wherein the plurality of features are organized in a hierarchy structure, wherein the hierarchy structure includes one or more super-features, each of the super-features including one or more meta-features, and each of the meta-features including one or more features selected from the plurality of features.

11. The method of claim 1, wherein the input data associated with the domain name includes a DNS zone file associated with the particular domain name, DNS logs associated with the particular domain name, DNS queries associated with the particular domain name, and WHOIS information associated with the particular domain name.

12. The method of claim 1, wherein the calculation of the reputation score of the particular domain name is performed by a machine-learning classifier based on the graph database, wherein the graph database includes feature vectors created based on an aggregation of information characterizing one or more of the following: a plurality of reference domain names, a plurality of servers, a plurality of domain name owners, a plurality of Classless Inter Domain Routing (CIDR) records, and a plurality of Autonomous System Number (ASN) records.

13. The method of claim 1, further comprising:
after the classification of the particular domain name as likely malicious, classifying a second client a likely malicious and assigning a corresponding reputation score to the second client, based on the graph database indicating that the second client queries the particular domain name.

14. A computer-implemented method for unsupervised domain name scoring, the method comprising:
receiving a request to provide a reputation score of a particular domain name;
receiving input data associated with the particular domain name;
extracting a plurality of features from the input data and the particular domain name;
generating a feature vector based on an aggregation of the plurality of features; and
calculating a reputation score of the particular domain name based on a similarity between the particular domain name and at least one domain name cluster in a graph databases;
the graph database comprising a plurality of nodes corresponding to IP addresses of clients and a plurality of nodes corresponding to domain names, which includes a node corresponding to the particular domain name, the graph database further comprising a plurality of arrows, each arrow connecting one of the plurality of client nodes to one of the plurality of domain name nodes, and each arrow representing a DNS request from the respective client about the respective domain name;
wherein said calculating the reputation score of the particular domain name based on a similarity between the particular domain name and at least one domain name cluster in a graph database comprises:
determining that a particular client is infected, and
based on the graph database, determining that the particular client has sent DNS queries about the particular domain with a threshold frequency, and
based on said determination and the at least one feature vector, classifying the particular domain name as likely malicious and any of creating or updating a corresponding reputation score to the at least one domain name cluster in which the particular domain name is classified.

15. The method of claim 14, further comprising: receiving input data associated with a plurality of reference domain names;
   extracting a plurality of trusted features from the received input data associated with the plurality of reference domain names;
   generating the graph database based on the plurality of trusted features and the plurality of reference domain names; and
   generating the at least one domain name cluster in the graph database, each of the at least one domain name clusters associated with domain names known to be malicious, domain names likely to be malicious, domain names known to be non-malicious, or domain names likely to be non-malicious.

16. The method of claim 14, wherein the reputation score is a numerical value between 0 and 1 that represents a probability that the particular domain name is associated with malicious activity.

17. The method of claim 14, wherein the plurality of features includes one or more features associated with network parameters of the particular domain name, one or more features associated with an owner of the particular domain name, one or more features associated with characteristics of the particular domain name, one or more features associated with a web traffic related to the particular domain name, and one or more features associated with clients, which accessed the particular domain name.

18. The method of claim 17, wherein the plurality of features further includes features associated with DNS queries or DNS responses.

19. The method of claim 14, wherein the input data associated with the particular domain name includes a DNS zone file associated with the domain name, DNS logs associated with the particular domain name, DNS queries associated with the particular domain name, and WHOIS information associated with the domain particular name.

20. The method of claim 14, wherein the calculation of the reputation score is performed by finding a similarity of the feature vector with one of domain name clusters in the graph database, wherein the graph database includes feature vectors created based on information characterizing one or more of the following: a plurality of reference domain names, a plurality of servers, a plurality of domain name owners, a plurality of Classless InterDomain Routing (CIDR) records, and a plurality of Autonomous System Number (ASN) records.

21. A computer-implemented method for domain name scoring, the method comprising:
   receiving a request to provide a reputation score of a particular domain name;
   receiving input data associated with the particular domain name;
   extracting a plurality of features from the received input data and the particular domain name;
   generating a feature vector based on the plurality of features;
   calculating a first reputation score of the particular domain name by a machine-learning classifier based on a graph database;
   calculating a second reputation score of the particular domain name by finding a similarity of the feature vector with a domain name cluster in the graph database; and
   providing an aggregate reputation score of the particular domain name based on a combination of the first reputation score and the second reputation score; and
   updating the graph database based on the aggregate reputation score of the particular domain name;
   the graph database comprising a plurality of nodes corresponding to IP addresses of clients and a plurality of nodes corresponding to domain names, which includes a node corresponding to the particular domain name, the graph database further comprising a plurality of arrows, each arrow connecting one of the plurality of client nodes to one of the plurality of domain name nodes, and each arrow representing a DNS request from the respective client about the respective domain name;
   wherein any of calculating the first reputation score of the particular domain name by the machine-learning classifier based on the graph database and calculating the second reputation score of the particular domain name by finding the similarity of the feature vector with a domain name cluster in the graph database, comprises:
   determining that a particular client is infected, and
   based on the graph database, determining that the particular client has sent DNS queries about the particular domain with a threshold frequency, and based on said determination and the at least one feature vector, classifying the particular domain name as likely malicious and assigning a corresponding reputation score to the particular domain name.

* * * * *